(12) United States Patent
Wu et al.

(10) Patent No.: US 11,971,747 B2
(45) Date of Patent: Apr. 30, 2024

(54) WEARABLE DEVICE

(71) Applicant: GUANGDONG GENIUS TECHNOLOGY CO., LTD., Dongguan (CN)

(72) Inventors: Kui Wu, Dongguan (CN); Zutao Jin, Dongguan (CN)

(73) Assignee: GUANGDONG GENIUS TECHNOLOGY CO., LTD., Dongguan (CN)

( * ) Notice: Subject to any disclaimer, the term of this patent is extended or adjusted under 35 U.S.C. 154(b) by 489 days.

(21) Appl. No.: 17/470,999

(22) Filed: Sep. 9, 2021

(65) Prior Publication Data
US 2021/0405592 A1 Dec. 30, 2021

Related U.S. Application Data

(63) Continuation of application No. PCT/CN2019/118107, filed on Nov. 13, 2019.

(30) Foreign Application Priority Data
May 14, 2019 (CN) .......................... 201910396859.1

(51) Int. Cl.
 *G06F 1/16* (2006.01)
 *G04G 17/04* (2006.01)
 *G04G 17/08* (2006.01)

(52) U.S. Cl.
 CPC ............ *G06F 1/163* (2013.01); *G06F 1/1652* (2013.01); *G04G 17/045* (2013.01); *G04G 17/08* (2013.01)

(58) Field of Classification Search
 CPC ..... G06F 1/163; G06F 1/1652; G04G 17/045; G04G 17/08
 See application file for complete search history.

(56) References Cited

U.S. PATENT DOCUMENTS 8,328,055 B1 * 12/2012 Snyder ...................... A45F 5/00
 224/267
8,662,362 B1 * 3/2014 Bastian .................. H04B 1/385
 248/205.2
(Continued)

FOREIGN PATENT DOCUMENTS

| CN | 105137743 A | 12/2015 |
| CN | 204838303 U | 12/2015 |

(Continued)

OTHER PUBLICATIONS

International Search Report issued in corresponding PCT Application No. PCT/CN2019/118107, dated Jan. 31, 2020.
(Continued)

*Primary Examiner* — Nidhi Thaker
(74) *Attorney, Agent, or Firm* — Westbridge IP LLC (57) ABSTRACT

A wearable device is disclosed. The wearable device includes: a wearable assembly and a display device detachably mounted on the wearable assembly, and the display device includes: a first body having a connecting end; a second body, which is rotatably connected to the connecting end of the first body, and can be folded inwardly toward the first body to overlap with the first body, or folded outwards away from the first body to unfold relative to each other; and, a flexible display device, which is covered on the first body and the second body, and can be folded inward or unfolded outward correspondingly with mutual rotation between the first body and the second body.

15 Claims, 8 Drawing Sheets

(56) References Cited

U.S. PATENT DOCUMENTS

| | | | | |
|---|---|---|---|---|
| 8,936,222 | B1* | 1/2015 | Bastian | A45F 5/00 |
| | | | | 224/183 |
| 8,939,333 | B2* | 1/2015 | Ivarez | H04B 1/3838 |
| | | | | 224/272 |
| 9,314,092 | B2* | 4/2016 | Wang | H04B 1/3877 |
| 9,929,765 | B2* | 3/2018 | Williams | A45F 5/00 |
| 10,362,855 | B2* | 7/2019 | Whang | A45F 5/00 |
| 10,568,410 | B2* | 2/2020 | Pierson | F16M 13/04 |
| 2002/0021622 | A1 | 2/2002 | Baroche | |
| 2016/0062392 | A1 | 3/2016 | Townsend et al. | |
| 2016/0357158 | A1 | 12/2016 | Kim et al. | |
| 2017/0139442 | A1 | 5/2017 | Yoshizumi | |
| 2017/0261941 | A1 | 9/2017 | Liu et al. | |
| 2020/0218312 | A1* | 7/2020 | Connor | G06F 1/1649 |
| 2023/0384825 | A1* | 11/2023 | Connor | G04G 17/083 |

FOREIGN PATENT DOCUMENTS

| | | |
|---|---|---|
| CN | 105378581 A | 3/2016 |
| CN | 205103554 U | 3/2016 |
| CN | 105867099 A | 8/2016 |
| CN | 107232700 A | 10/2017 |
| CN | 107390504 A | 11/2017 |
| CN | 108021191 A * | 5/2018 |
| CN | 108021191 A | 5/2018 |
| CN | 109372842 A | 2/2019 |
| CN | 208523936 U | 2/2019 |
| CN | 110032057 A | 7/2019 |
| CN | 209690725 U | 11/2019 |
| KR | 20180006721 A | 1/2018 |
| WO | 2015099809 A1 | 7/2015 |

OTHER PUBLICATIONS

First Office Action issued in counterpart Chinese Patent Application No. 201910396859.1, dated Jan. 1, 2024.
Extended European Search Report issued in counterpart European Patent Application 19928409.2, dated Jan. 19, 2023.
Search Report issued in counterpart Singapore Patent Application 11202109956P, dated Dec. 7, 2022.
Written Opinion issued in counterpart Singapore Patent Application 11202109956P, dated Dec. 8, 2022.

* cited by examiner

WEARABLE DEVICE

CROSS-REFERENCE TO RELATED APPLICATIONS

The present application is a continuation application of International Application No. PCT/CN2019/118107 filed on Nov. 13, 2019, which claims priority to Chinese Patent Application No. 201910396859.1, filed on May 14, 2019, which are incorporated herein by reference in their entireties.

TECHNICAL FIELD

The present application relates to the technical field of electric devices, and in particularly, to a wearable device.

BACKGROUND

As we all know, terminal devices such as wristbands and smart watches usually have wearability and display functions. Display areas of bracelets and smart watches mainly have two shapes: circular and square. Taking a smart watch as an example, as the functions of the smart watch gradually increase, operations of a user on the display area of the smart watch correspondingly increases. However, the display area of the current smart watch is generally within 1.6 inches, obviously its display area is small, and the display experience is poor. Especially for the circular display screen, when the user is operating by hand, one finger occupies almost half of the display area. If the user needs to operate for a long time, the user needs to keep raising the wrist which wears the smart watch or cannot operate freely with single hand. The operation experience is restricted, and the experience effect is poor. Moreover, the existing smart watches capable of communicating need to make a sound through a loudspeaker, so that audio content can be easily heard by others, thereby a problem of privacy is raised.

SUMMARY

One of the objectives of the embodiments of the present application is to provide a wearable device, which aims to solve the problems of the existing wearable device that the display area is small, the touch experience is poor, and the voice privacy protection is insufficient.

In order to solve the above technical problems, the technical solution of embodiments of the present application is to provide a wearable device, including: a wearable assembly and a display device which is detachably mounted on the wearable assembly, and the display device includes:

a first body having a connecting end;

a second body, which is rotatably connected to the connecting end of the first body, and can be folded inwardly toward the first body to overlap with the first body, and after the second body is detached from the wearable assembly, the second body can be folded outwards away from the first body to unfold relative to each other; and, a flexible display device, which is covered on the first body and the second body, and can be folded inward or unfolded outward correspondingly with mutual rotation between the first body and the second body.

In one embodiment, the wearable device further includes a connecting means for realizing mutual folding of the first body and the second body, and the connecting end of the first body is rotatably connected to a connecting end of the second body through the connecting means, and the flexible display device is located outside the connecting means.

In one embodiment, an opening/closing angle between the first body and the second body is 0° to 180°.

In one embodiment, the connecting means includes one or more of a folding sheet and a folding tube that can be folded.

In one embodiment, the connecting means includes a rotating shaft.

In one embodiment, the rotating shaft is a damped rotating shaft.

In one embodiment, the flexible display device is fixed on the display device by waterproof double-sided tape or glue.

In one embodiment, the wearable device further includes a lock mechanism, and the wearable assembly includes:

a watch band; and a bracket connected to the watch band, and the second body is detachably connected to the bracket through the lock mechanism;

the lock mechanism includes:

a lock button, having one end inserted into the bracket;

a first return spring, having one end connected to the lock button and the other end connected to the bracket;

a lock buckle, both ends of which are respectively inserted into the bracket and the second body and abut against an end of the lock button passing through the bracket; and, a second return spring, having one end connected to the lock buckle and the other end connected to the second body.

In one embodiment, the bracket defines a groove for receiving the display device after being folded.

In one embodiment, two opposite ends of the bracket are respectively provided with one lock mechanism, and two ends of the lock mechanism are respectively located in the bracket and the second body.

In one embodiment, the lock button includes an abutment portion and an insertion portion that are connected in turn, and the bracket defines an abutment groove and an insertion groove that are communicated in turn. The insertion portion is inserted into the insertion groove to abut against an end of the lock buckle, and an end of the abutment portion abuts against a groove wall of the abutment groove to limit a moving position of the lock button when it is pressed.

In one embodiment, one end of the first return spring is inserted into the abutment portion, the other end of the first return spring abuts against the groove wall of the abutment groove, and a through hole is defined in the abutment portion, and a first connecting groove communicating with the abutment groove is defined in the bracket.

The lock mechanism further includes a limiter that passes through the first connecting groove and the through hole in turn. Both ends of the limiter are respectively located in the first connecting groove, and a middle part of the limiter is located in the through hole. Two opposite sides of the middle part of the limiter abut against a wall of the through hole and both ends of the limiter abut against a groove wall of the first connecting groove to limit a rebounding position of the lock button.

In one embodiment, the limiter is a vertically positioned elastic sheet, and the elastic sheet is in an "S" shape.

In one embodiment, the lock buckle includes a connecting portion and a moving portion connected in turn, and an end of the connecting portion away from the moving portion is inserted into the insertion groove to abut against the insertion portion, the second body defines a second connecting groove and a receiving groove communicated in turn, and two ends of the second return spring are respectively connected with the connecting portion and a groove wall of the second connecting groove.

In one embodiment, both ends of the second return spring respectively abut against the connecting portion and the groove wall of the second connecting groove, and the lock mechanism further includes a non-enclosed clamping member. The clamping member is sleeved on an end of the moving portion away from the connecting portion.

In one embodiment, a card slot is defined at a position where the moving portion is connected to the clamping member, and the clamping member is clamped in the card slot.

The beneficial effects of the wearable device provided by the present application are that, compared with the prior art, the connecting end of the first body and the second body are rotationally connected to achieve mutual rotation, so that the first body and the second body have folding or unfolding effect and drive the flexible display device to be folded or unfolded; moreover, the display device and the wearable assembly are detachably connected, and a detachable and foldable combination may maximize an improvement of the user experience. The wearable device can be taken out during use and used as a mobile phone, so that the wearable device may guarantee voice privacy, such as call privacy, and may be folded back after use for easier operation.

BRIEF DESCRIPTION OF THE DRAWINGS

In order to illustrate the technical solutions of the embodiments of the present application in a clearer manner, the drawings desired for describing the embodiments of the present application will be described hereinafter briefly. Obviously, the following drawings merely relate to some embodiments of the present application, and based on these drawings, a person skilled in the art may obtain the other drawings without any creative effort.

DETAILED DESCRIPTION

In order to make the purposes, technical solutions, and advantages of the present application clearer and more understandable, the present application will be further described in detail hereinafter with reference to the accompanying drawings and embodiments. It should be understood that the embodiments described herein are only intended to illustrate but not to limit the present application. The following embodiments are for illustrative purposes only, but shall not be used to limit the scope of the present application.

It should be noted that when an element is described as "fixed" or "arranged" on/at another element, it means that the element can be directly or indirectly fixed or arranged on/at another element. When an element is described as "connected" to/with another element, it means that the element can be directly or indirectly connected to/with another element. Terms like "upper", "lower", "left", "right" indicating orientation or positional relationship are based on the orientation or the positional relationship shown in the drawings, and are merely for facilitating and simplifying the description of the present application, and thus should not be construed as limiting the application. Terms like "first" and "second" are only used for the purpose of description, and will in no way be interpreted as indication or hint of relative importance or implicitly indicate the number of the referred technical features. Terms like "multiple"/"a plurality of" refer to the number of two or more than two, except for clear and particular restriction.

In order to explain the technical solutions of the present application, detailed description is given below with reference to specific drawings and embodiments.

Some embodiments of the present application provide a wearable device, which may include electronic devices such as a watch and a bracelet. The following embodiments all take a watch as an example. The wearable device includes a wearable assembly 1 and a display device 2 detachably mounted on the wearable assembly 1, and the display device 2 includes a first body 211, a second body 212 and a flexible display device 22. The first body 211 has a connecting end, and the second body 212 is rotationally connected to a connecting end of the first body 211 to achieve rotation relative to each other. The second body 212 can be folded inwardly toward the first body 211 to overlap with the first body 211, and after the second body 212 is detached from the wearing component 1, the second body 212 can be folded outwards away from the first body 211 to be unfolded relative to each other. The flexible display device 22 is covered on the first body 211 and the second body 212, and can be folded inward or unfolded outward correspondingly with mutual rotation between the first body 211 and the second body 212.

Under normal circumstances, when a user uses a watch mode, the second body 212 can be folded inwardly toward the first body 211 to overlap with the first body 211, so that a part of the flexible display device 22 provided on the second body 212 moves with the second body 212, and then the flexible display device 22 is contracted to be equal to or smaller than a width of a wrist. A part of the flexible display device 22 provided on the first body 211 is used for display work, and there is no display on the part of the flexible display device 22 provided on the second body 212, and daily functions, such as viewing time, weather, and news may be satisfied. The covered display device 2 is detachably mounted on the wearable assembly 1, so that the display device 2 may be used as a watch.

The second body 212 detached from the wearable assembly 1 can be folded outward in a direction away from the first body 211 to be unfolded relative to each other, so that the entire flexible display device 22 is used for display, and the display device 2 being flattened is similar as a small mobile phone which may be convenient for users to use.

In the wearable device of the embodiments of the present application, the connecting end of the first body 211 and the second body 212 are rotationally connected to achieve mutual rotation relative to each other, so that the first body 211 and the second body 212 have folding or unfolding effect and drive the flexible display device 22 to be folded or unfolded. In addition, the display device 2 and the wearable assembly 1 are detachably connected, and detachable and foldable combination may maximize the improvement of the user experience. The wearable device can be taken out during use and can be used as a mobile phone, therefore the wearable device may guarantee voice privacy, such as call privacy, and may be folded back after use for easy operation.

In one embodiment, an opening/closing angle between the first body 211 and the second body 212 is 0° to 180°.

In one embodiment, the wearable device further includes a connecting means 213 for realizing mutual folding of the first body 211 and the second body 212, and the connecting end of the first body 211 is rotatably connected to a connecting end of the second body 212 through the connecting means 213, and the flexible display device 22 is located outside the connecting means 213, that is, the flexible display device 22 is located outside a whole constituted of the first body 211, the second body 212, and the connecting means 213. Since the opening/closing angle between the first body 211 and the second body 212 is 0°-180°, when the opening/closing angle between the first body 211 and the second body 212 is 0°, that is, when the first body 211 and the second body 212 are folded and covered, the connecting means 213 is folded to form an arc-shaped structure; when the opening/closing angle between the first body 211 and the second body 212 is 180°, that is, when the first body 211 and the second body 212 are placed side by side, the connecting means 213 is unfolded to form a "-"-shaped structure, so that the rotation of the connecting means may have a fixed rotation track and rotation radius, and the rotation of the flexible display device 22 may have a fixed rotation track and rotation radius. As a result, the wrinkles of the flexible display device 22 when the bodies are turned over may be reduced, thereby improving the display effect, and facilitating touch operation. Compared with direct folding the flexible display device 22, the first body 211 and the second body 212 are folded to each other by the connecting means 213 to realize the folding of the flexible display device 22, thereby the life of the flexible display device 22 may be protected.

In one embodiment, the connecting means 213 includes one or more of a folding sheet and a folding tube that can be folded. That is, the connecting means 213 may be a single folding sheet or a folding tube, and may also be a combination of a folding sheet and a folding tube. Among them, the folding tube is a folding piece that can be folded at a fixed point at any angle, which similar to a support rod of a desk lamp, and has a relatively simple structure.

In another embodiment, the connecting means 213 includes a rotating shaft, and the rotating shaft is a damped rotating shaft, so that the first body 211 or the second body 212 can be folded at a fixed point at any angle. Using the connecting means 213 with the above structure, the first body 211 and the second body 212 can be stopped at any angle, and the user may choose a best experience effect through different unfolding angles.

In one embodiment, the connecting means 213 is made of a metal material or a plastic material, that is, the connecting means 213 includes a metal connecting means 213 or a plastic connecting means 213.

In one embodiment, the flexible display device 22 includes a flexible display screen and a flexible touch screen, so that the flexible display device 22 has display and touch functions. Where the flexible display device 22 is fixed on the display device 2 by waterproof double-sided tape or glue. Of course, only when the flexible display device 22 is a flexible display screen, it can be activated and controlled by voice, and unfolding is only for a larger display area and easy operation.

Figure 1:
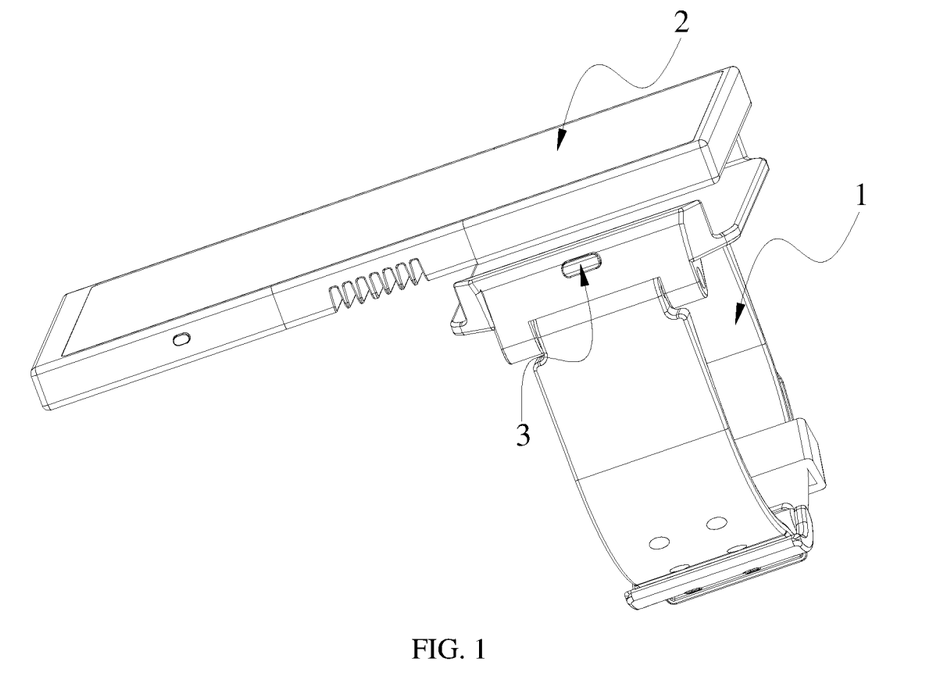
FIG. 1 is a schematic perspective view of a wearable device provided by an embodiment of the present application.
Figure 2:
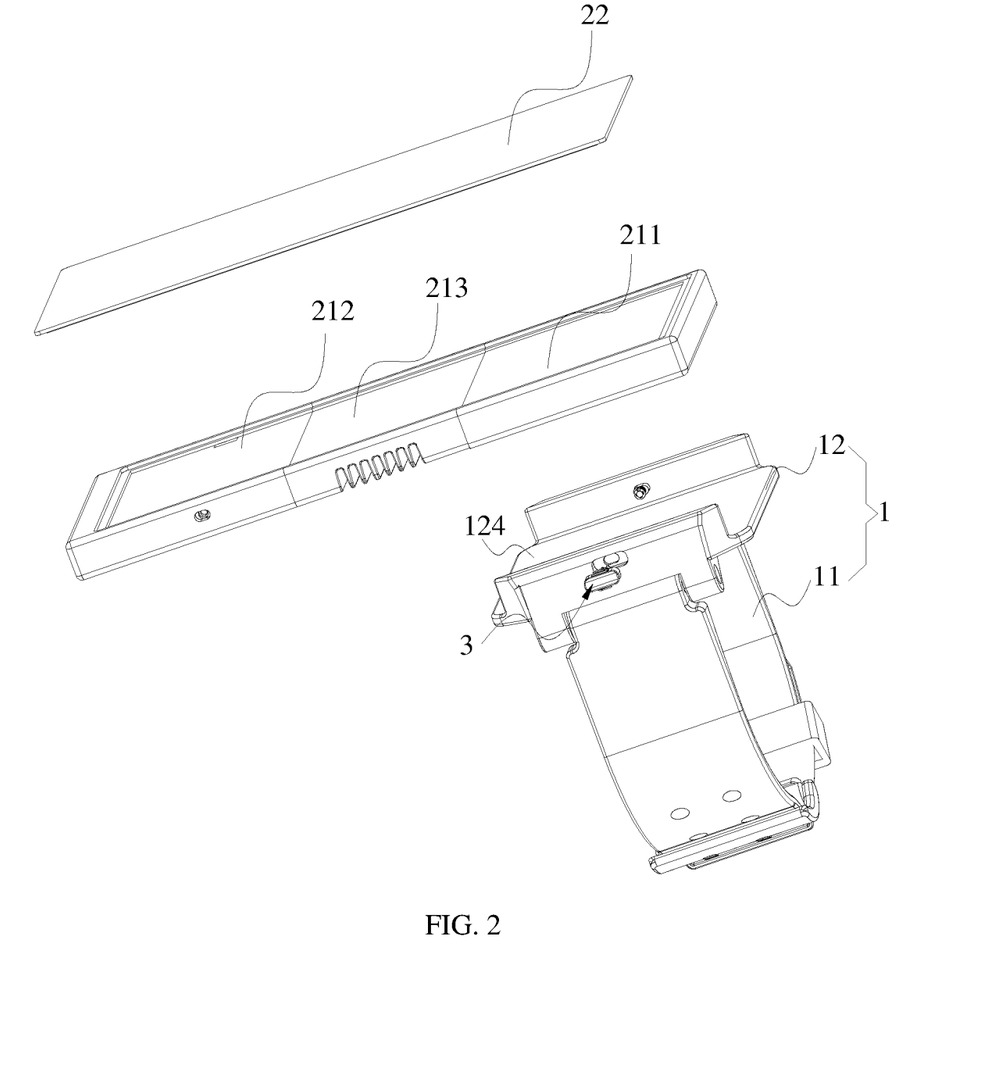
FIG. 2 is a schematic exploded view of the wearable device in FIG. 1.
Figure 3:
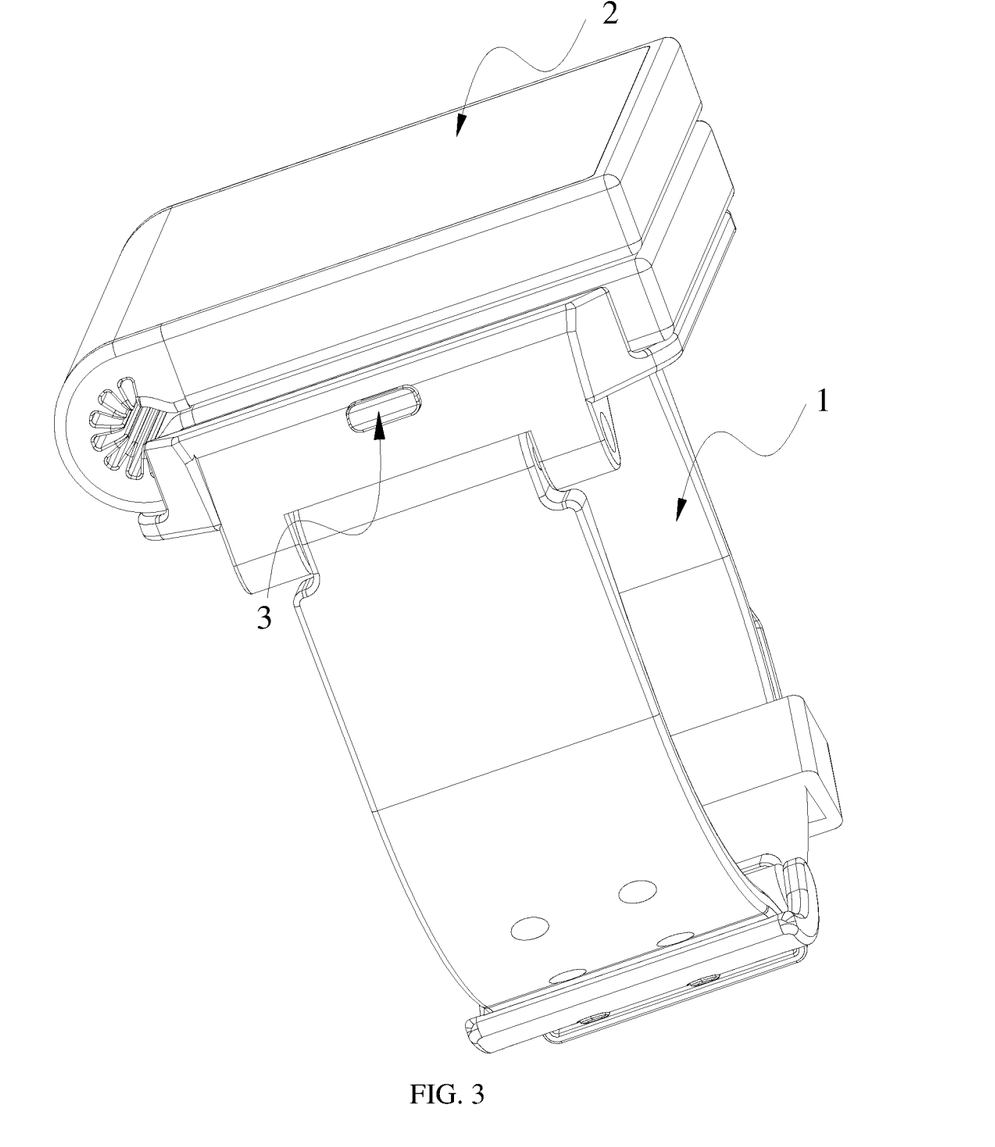
FIG. 3 is a schematic perspective view of the wearable device in FIG. 1 after being folded.
Figure 4:
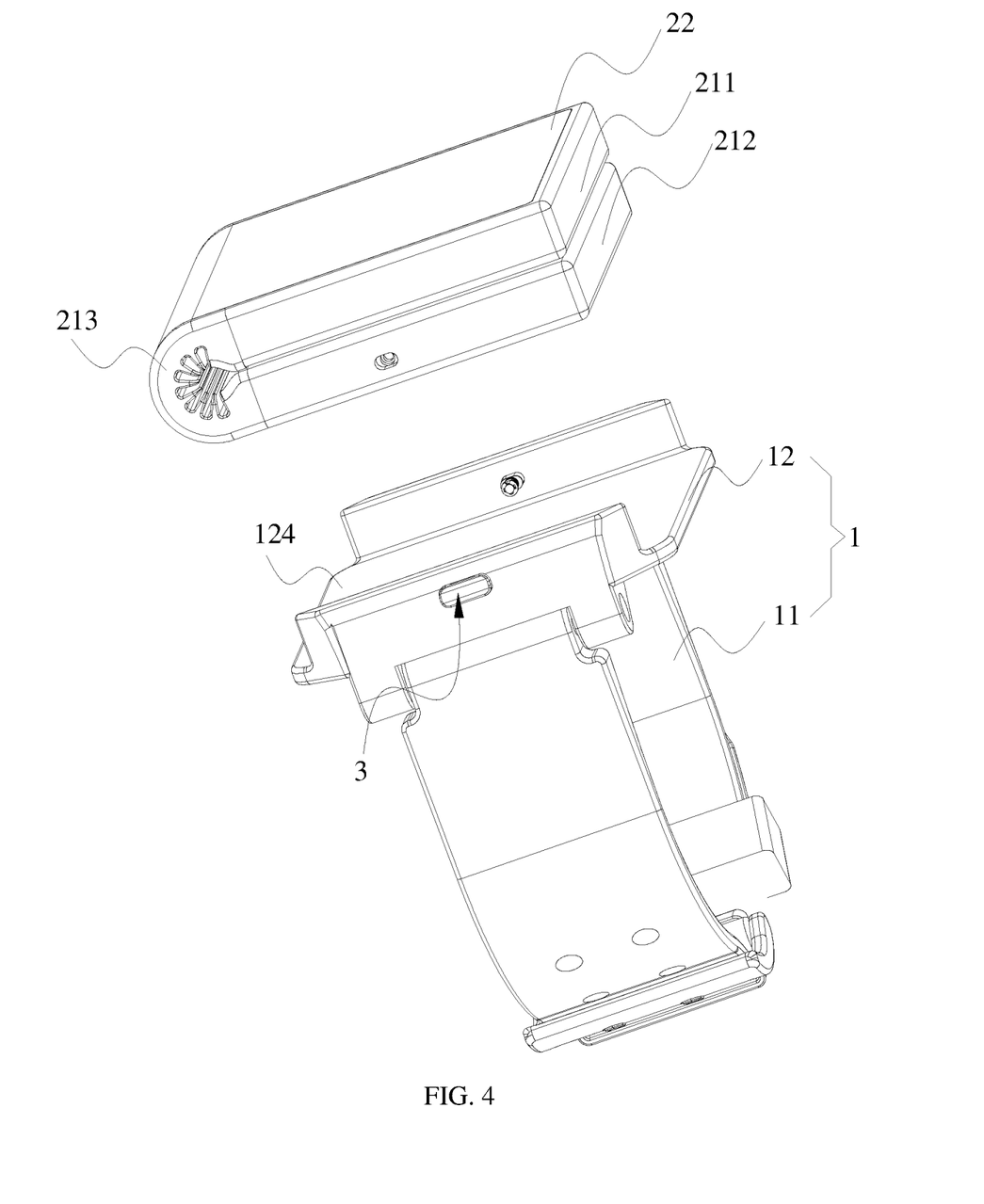
FIG. 4 is a schematic exploded view of the wearable device in FIG. 3.

In one embodiment, referring to FIG. 2 and FIG. 4, the wearable device further includes a lock mechanism 3, and the wearable assembly 1 includes a watch band 11 and a bracket 12 connected to the watch band 11. The second body is detachably connected to the bracket 12 through the lock mechanism 3. When the second body 212 is detached from the bracket 12, the second body 212 is folded outwards along a direction of the connecting means 213 away from the first body 211 to be unfolded from the first body 211. The number of the lock mechanism 3 is at least one, and in specific applications, the number of the lock mechanism 3 is one, two or more. The bracket 12 defines a groove 124, and the groove 124 is used for receiving the display device 2 after being covered. Two opposite ends of the bracket 12 are respectively provided with one lock mechanism 3 detachably inserted into the end of the bracket 12, and two ends of the lock mechanism 3 are respectively located in the bracket 12 and the second body 212.

Of course, in other embodiments, the first body 211 is detachably connected to the bracket 12 through the lock mechanism 3, or one end of the lock mechanism 3 is located between the first body 211 and the second body 212, for example, grooves are provided on the first body 211 and the second body 212 respectively. When the first body 211 and the second body 212 are covered with each other, the grooves on the first body 211 and the second body 212 form a connecting hole for receiving the lock mechanism 3, so that one end of the lock mechanism 3 can be inserted into the connecting hole.

Figure 5:
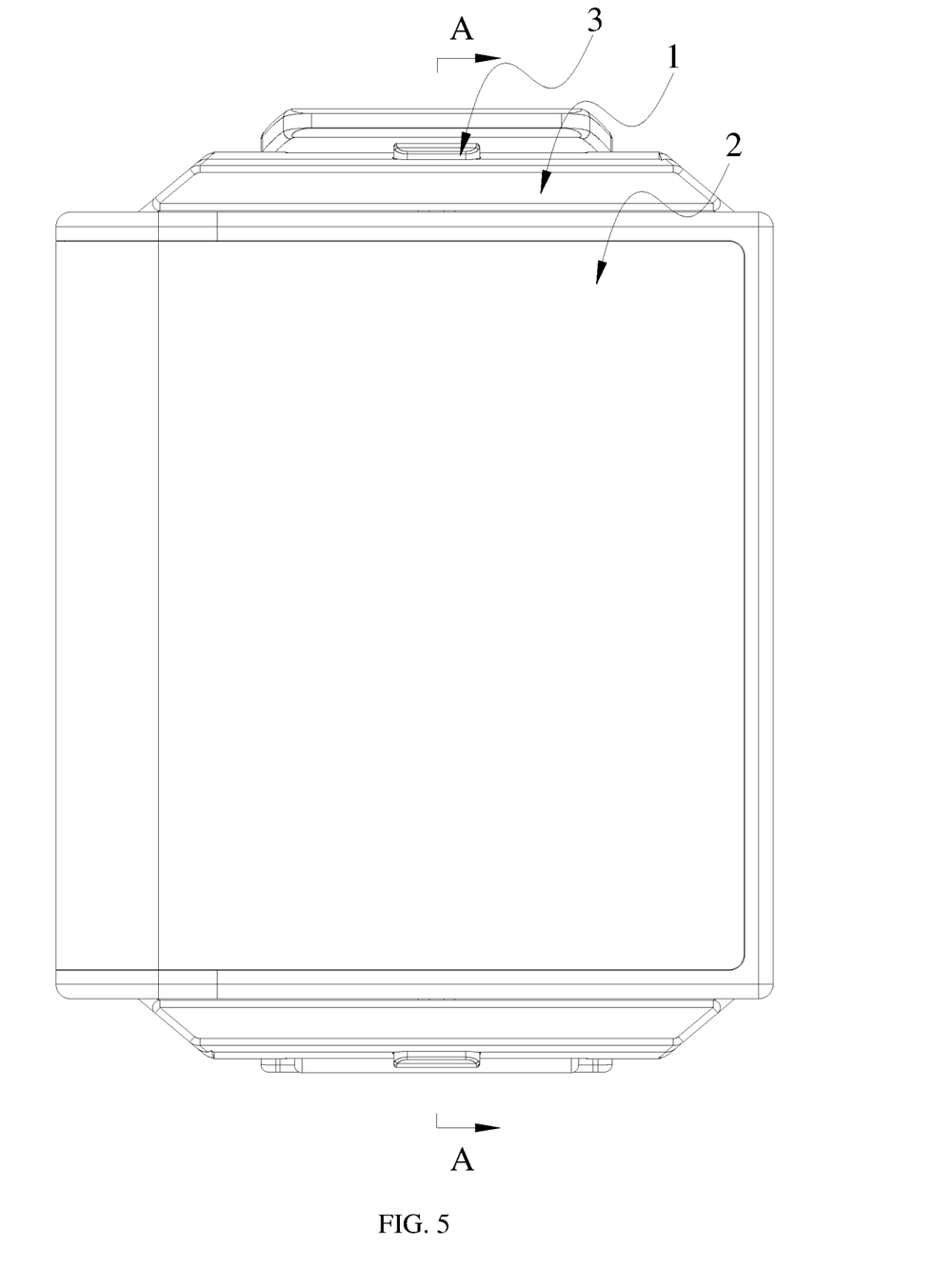
FIG. 5 is a schematic top view of a wearable device in FIG. 3.
Figure 6:
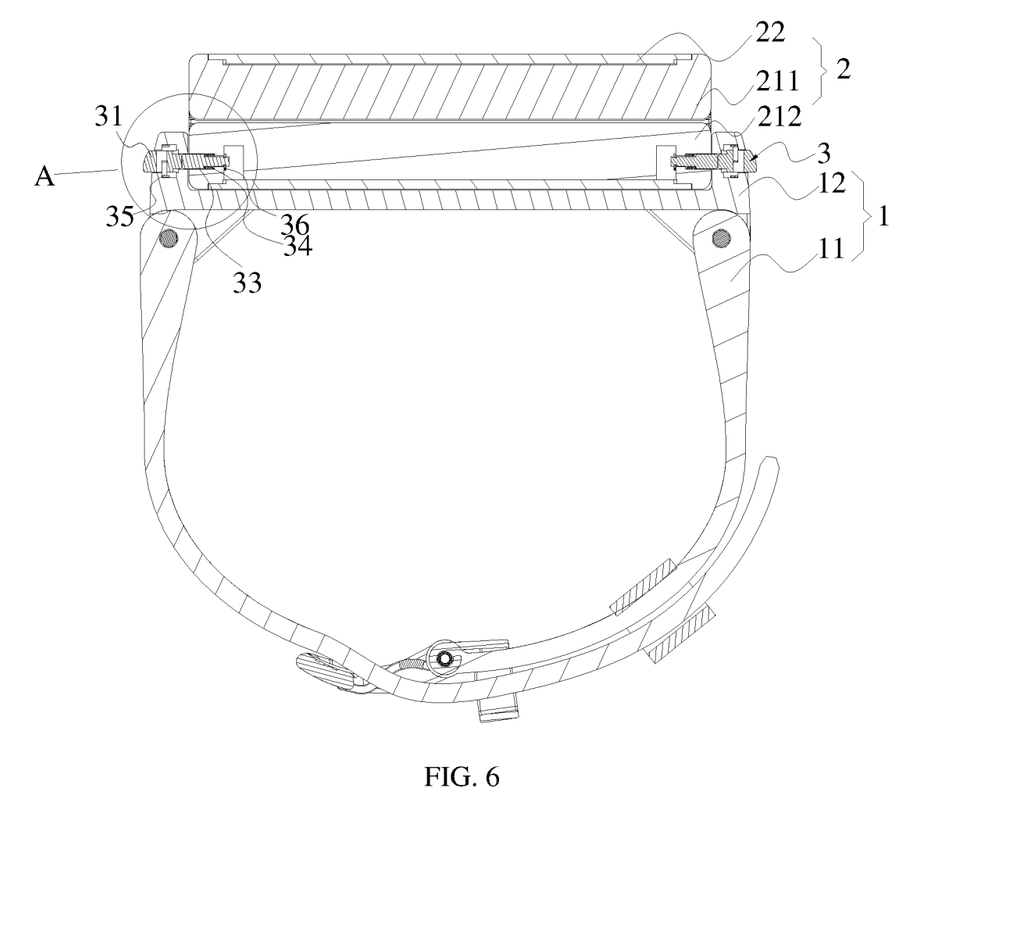
FIG. 6 is a sectional view of the wearable device along line A-A' in FIG. 5.
Figure 8:
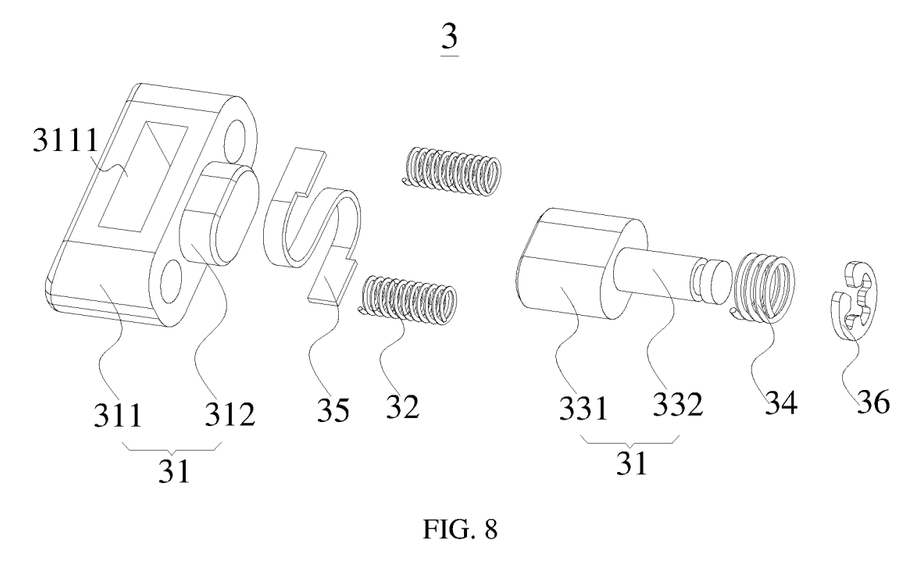
FIG. 8 is a schematic exploded view of the lock mechanism of the wearable device in FIG. 1.

In one embodiment, in conjunction with FIG. 5, FIG. 6, and FIG. 8, the lock mechanism 3 includes: a lock button 31, a first return spring 32, a lock buckle 33, and a second return spring 34. One end of the lock button 31 is inserted into the bracket 12; two ends of the first return spring 32 are respectively connected to the lock button 31 and the bracket 12; both ends of the lock buckle 33 are respectively penetrated through the bracket 12 and the second body 212 and abut against an end of the lock button 31 passing through the bracket 12; and two ends of the second return spring 34 are respectively connected to the lock buckle 33 and the second body 212. The other end of the lock button 31 can extend out of the bracket 12, and it can also be located in the bracket 12.

Understandably, when it extends out of the bracket 12, it can be directly squeezed by hand, and when it is in the bracket 12, it can be squeezed with the help of a tool. When the display device 2 is detached, one end of the lock button 31 is squeezed by hand or a tool, so that the other end of the lock button 31 squeezes the lock buckle 33, and the lock buckle 33 is separated from the bracket 12, therefore the display device 2 can be detached from the bracket 12. The lock button 31 squeezes the first return spring 32 during a squeezing process, and the lock buckle 33 squeezes the second return spring 34 during the squeezing process, so that the first return spring 32 and the second return spring 34 are respectively in a compressed state. When the display device 2 is taken out, the lock button 31 returns to an original position under the action of the first return spring 32, and the lock catch 33 returns to an original position under the action of the second return spring 34.

Figure 7:
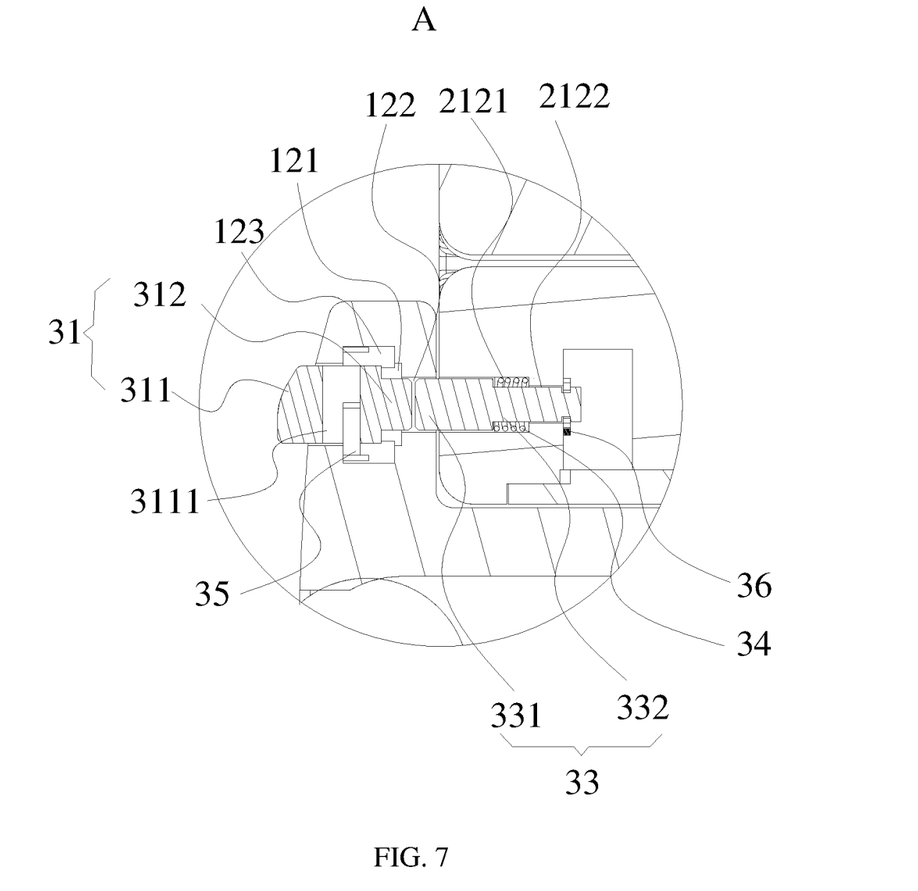
FIG. 7 is a partial enlarged schematic view of part A in FIG. 6.

In one embodiment, referring specifically to FIG. 7, in order to prevent the lock button 31 from overly squeezing the first return spring 32 and causing the first return spring 32 to lose its resilience, the lock button 31 includes an abutment portion 311 and an insertion portion 312 that are connected in turn, and the bracket 12 defines an abutment groove 121 and an insertion groove 122 that are communicated in turn. The insertion portion 312 is inserted into the insertion groove 122 to abut against an end of the lock buckle 33, and an end of the abutment portion 311 abuts against a groove wall of the abutment groove 121 to limit a pressing position of the lock buckle 33. When the abutment portion 311 is pressed, the abutment portion 311 drives the insertion portion 312 to move inward together, so that the insertion portion 312 squeezes the lock buckle 33. When the abutment portion 311 abuts against the groove wall of the abutment groove 121, the abutment portion 311 will no longer move inward.

In one embodiment, referring to FIG. 7 and FIG. 8, when one end of the first return spring 32 is inserted into the abutment portion 311, and the other end of the first return spring 32 abuts against the groove wall of the abutment groove 121, in order to avoid the lock button 31 being released from the bracket 12 under the action of the resilience of the first return spring 32, the lock mechanism 3 further includes a limiter 35.

A through hole 3111 is defined in the abutment portion 311, and a first connecting groove 123 communicating with the abutment groove 121 is defined in the bracket 12. One end of the abutment portion 311 passes through the first connecting groove 123 and the abutment groove 121 in turn and abuts against the lock buckle 33. The limiter 35 passes through the first connecting groove 123 and the through hole 3111 in turn, a middle part of the limiter 35 is located in the through hole 3111. Both ends of the limiter 35 are respectively located in the first connecting groove 123, and two opposite sides of the limiter 35 are respectively abut against the through hole 3111 to limit a rebounding position of the lock button 31, thereby avoiding the lock button 31 being released from the bracket 12. Specifically, the limiter 35 is a vertically positioned elastic sheet, the elastic sheet is in an "S" shape, a middle part of the elastic sheet is located in the through hole 3111 of the abutment portion 311, both ends of the elastic sheet are located in the connecting groove, and both sides of the elastic sheet abut against the through hole 3111.

Of course, in other embodiments, when one end of the first return spring 32 is fixedly connected to the abutment portion 311, and the other end of the second return spring 34 is fixedly connected to the groove wall of the abutment groove 121, the limiter 35 is not required to limit a rebounding position of the lock button 31. Since the first return spring 32 is fixedly connected to the lock button 31 and the bracket 12, the first return spring 32 can pull the lock button 31 while rebounding.

In one embodiment, the lock buckle 33 includes a connecting portion 331 and a moving portion 332 connected in turn, and an end of the connecting portion 331 away from the moving portion 332 is inserted into the insertion groove 122 to abut against the insertion portion 312, the second body 212 defines a second connecting groove 2121 and an receiving groove 2122 communicated in turn, and two ends of the second return spring 34 are respectively abut against the connecting portion 331 and a groove wall of the second connecting groove 2121. Specifically, the connecting portion 331 is located in the second connecting groove 2121, and when the button of the lock buckle 33 is pushed, the moving portion 332 is pushed to move in the receiving groove 2122.

When both ends of the second return spring 34 respectively abut against the connecting portion 331 and the groove wall of the second connecting groove 2121, the lock mechanism 3 further includes a non-enclosed clamping member 36. The clamping member 36 is sleeved on an end of the moving portion 332 away from the connecting portion 331. Specifically, a card slot is defined at a position where the moving portion 332 is connected to the clamping member 36, and the clamping member 36 is clamped in the card slot. When the lock button 31 is squeezed, the connecting portion 331 can be pushed to move by the clamping member 36 because the clamping member 36 is not enclosed, so that the connecting portion 331 is separated from the insertion groove 122, and the second return spring 34 is compressed. When the display device 2 is detached, the lock buckle 33 recovers under the action of the rebounding of the second return spring 34, and the buckle will not be separated from the second body 212 due to the action of the clamping member 36.

Of course, in other embodiments, when the two ends of the second return spring 34 are respectively fixedly connected to the connecting portion 331 and the groove wall of the second connecting groove 2121, there is no need for the clamping member 36 to pull the lock buckle 33. The lock buckle 33 is reset under the action of the second return spring 34, and at the same time, the second return spring 34 pulls the lock buckle 33 to prevent the lock catch 33 from separating from the second body 212.

The above description is only optional embodiments of the present application and is not intended to limit the present application. For those skilled in the art, the present application can have various modifications and changes. Any modification, equivalent replacement, and improvement made within the spirit and principle of the present application shall be included within the protection scope of the present application.

What is claimed is:

1. A wearable device, comprising: a wearable assembly and a display device detachably mounted on the wearable assembly, and the display device comprises: a first body, having a connecting end; a second body, which is rotatably connected to the connecting end of the first body, and can be folded inwardly toward the first body to overlap with the first body, and after the second body is detached from the wearing component, the second body can be folded outwards away from the first body to unfold relative to each other; and, a flexible display device, which is covered on the first body and the second body, and can be folded inward or unfolded outward correspondingly with mutual rotation between the first body and the second body, wherein the wearable device further comprises a lock mechanism, and the wearable assembly comprises: a watch band; and a bracket connected to the watch band, and the second body is detachably connected to the bracket through the lock mechanism; the lock mechanism comprises: a lock button having one end inserted into the bracket; a first return spring, having one end connected to the lock button and the other end connected to the bracket; a lock buckle, both ends of which are respectively inserted into the bracket and the second body and abut against an end of the lock button passing through the bracket; and, a second return spring, having one end connected with the lock buckle and the other end connected with the second body.

2. The wearable device according to claim 1, wherein the wearable device further comprises a connecting means for realizing mutual folding of the first body and the second body, and the connecting end of the first body is rotatably connected to a connecting end of the second body through the connecting means, and the flexible display device is located outside the connecting means.

3. The wearable device according to claim 2, wherein an opening/closing angle between the first body and the second body is 0° to 180°.

4. The wearable device according to claim 2, wherein the connecting means comprises one or more of a folding sheet and a folding tube that can be folded.

5. The wearable device according to claim 2, wherein the connecting means comprises a rotating shaft.

6. The wearable device according to claim 5, wherein the rotating shaft is a damped rotating shaft.

7. The wearable device according to claim 1, wherein the flexible display device is fixed on the display device by waterproof double-sided tape or glue.

8. The wearable device according to claim 1, wherein the bracket defines a groove for receiving the display device after being folded.

9. The wearable device according to claim 8, wherein two opposite ends of the bracket are respectively provided with one lock mechanism, and the two ends of the lock mechanism are respectively located in the bracket and the second body.

10. The wearable device according to claim 1, wherein the lock button comprises an abutment portion and an insertion portion that are connected in turn, and the bracket defines an abutment groove and an insertion groove that are communicated in turn, the insertion portion is inserted into the insertion groove to abut against an end of the lock buckle, and an end of the abutment portion abuts against a groove wall of the abutment groove to limit a moving position of the lock button when it is pressed.

11. The wearable device according to claim 10, wherein one end of the first return spring is inserted into the abutment portion, the other end of the first return spring abuts against the groove wall of the abutment groove, and a through hole is defined in the abutment portion, and a first connecting groove communicating with the abutment groove is defined in the bracket; the lock mechanism further comprises a limiter, the limiter passes through the first connecting groove and the through hole in turn, and both ends of the limiter are located in the first connecting groove, a middle part of the limiter is located in the through hole, and two opposite sides of the middle part of the limiter abut against a wall of the through hole to limit a rebounding position of the lock button.

12. The wearable device according to claim 11, wherein the limiter is a vertically positioned elastic sheet, the elastic sheet is in an "S" shape, a middle part of the elastic sheet is located in the through hole of the abutment portion, both ends of the elastic sheet are located in the first connecting groove, and both sides of the elastic sheet abut against the through hole.

13. The wearable device according to claim 11, wherein the lock buckle comprises a connecting portion and a moving portion connected in turn, and an end of the connecting portion away from the moving portion is inserted into the insertion groove to abut against the insertion portion, the second body defines a second connecting groove and a receiving groove communicated in turn, and two ends of the second return spring are respectively connected with the connecting portion and a groove wall of the second connecting groove.

14. The wearable device according to claim 13, wherein both ends of the second return spring respectively abut against the connecting portion and the groove wall of the second connecting groove, and the lock mechanism further comprises a non-enclosed clamping member, and the clamping member is sleeved on an end of the moving portion away from the connecting portion.

15. The wearable device according to claim 14, wherein a card slot is defined at a position where the moving portion is connected to the clamping member, and the clamping member is clamped in the card slot.

\* \* \* \* \*